Nov. 13, 1945. R. W. CALLAGHAN ET AL 2,388,902
STARCH-GLUTEN SEPARATION
Filed March 27, 1944 3 Sheets-Sheet 1
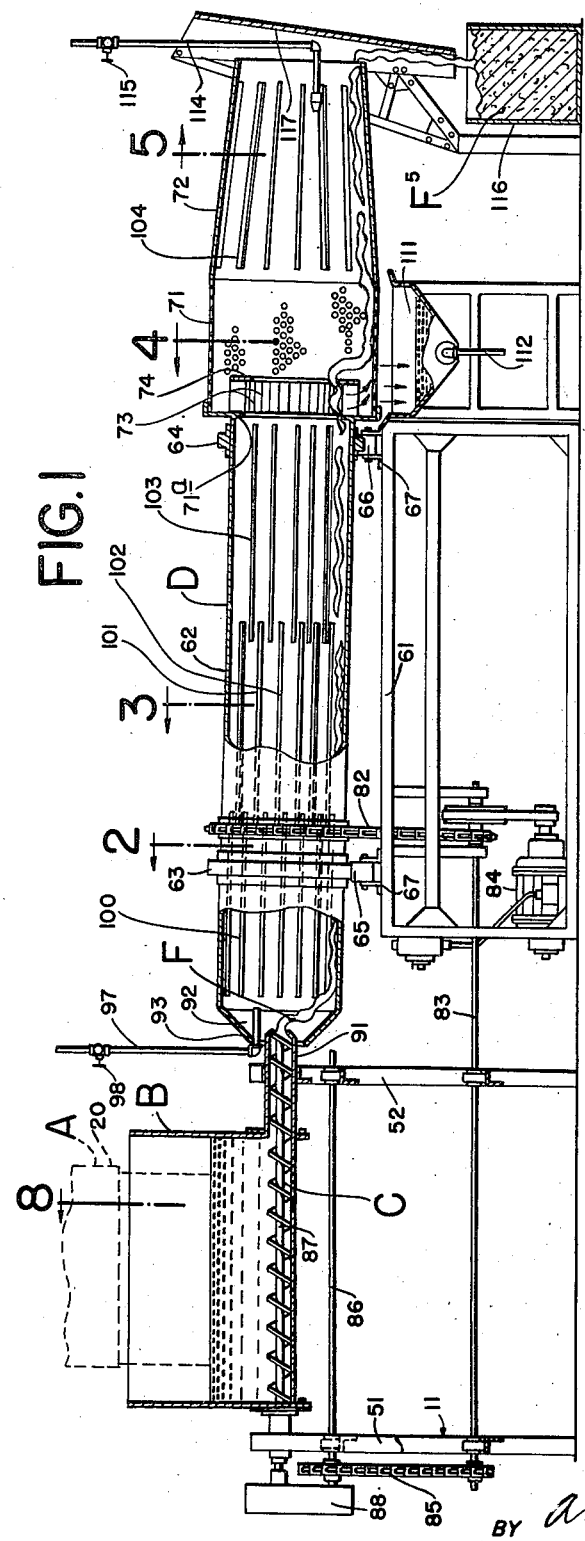
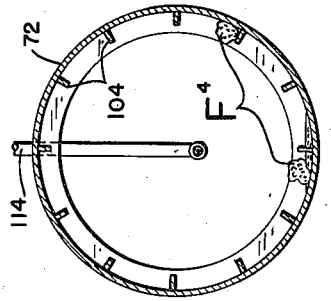
INVENTORS:-
ROBERT W. CALLAGHAN
GERARD W. ELVERUM
BY Anthony A. Juettner
ATTY.

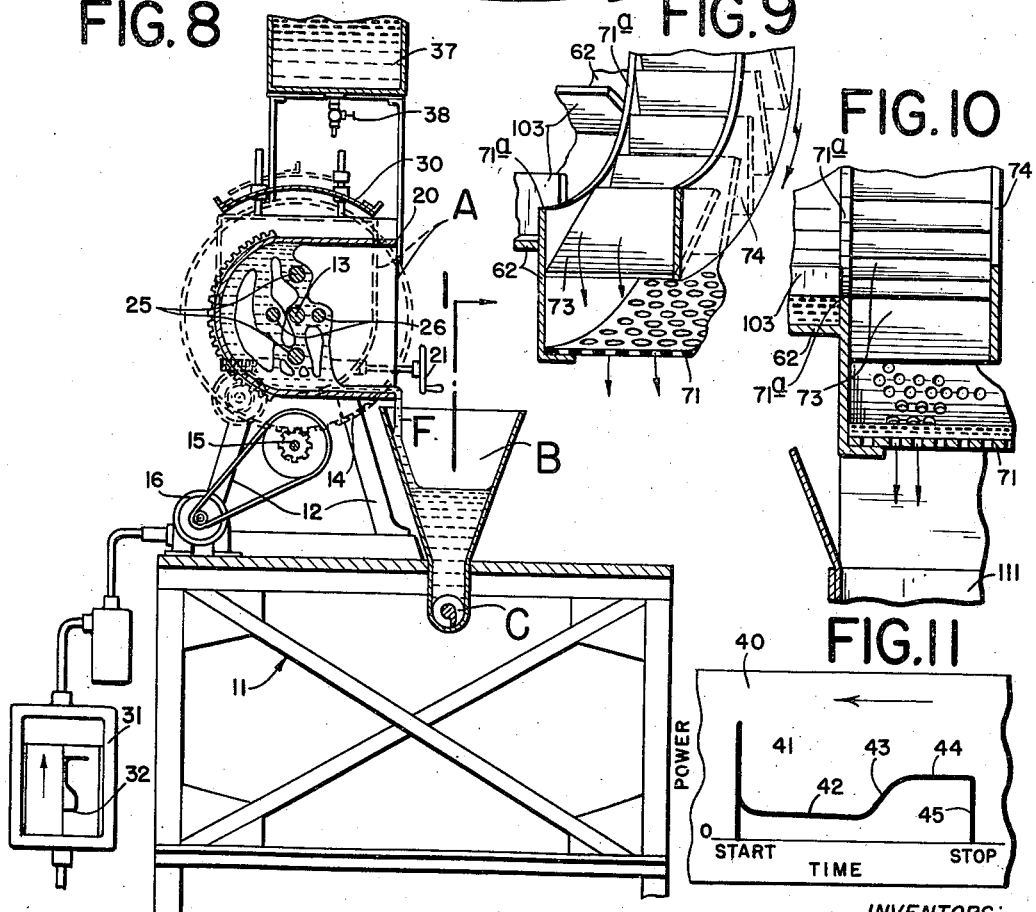

Nov. 13, 1945.                R. W. CALLAGHAN ET AL                2,388,902
                              STARCH-GLUTEN SEPARATION
                            Filed March 27, 1944        3 Sheets-Sheet 3

INVENTORS:-
ROBERT W. CALLAGHAN
GERARD W. ELVERUM
BY Anthony A. Juettner
ATTY.

Patented Nov. 13, 1945

2,388,902

UNITED STATES PATENT OFFICE 2,388,902

STARCH-GLUTEN SEPARATION

Robert W. Callaghan, Keokuk, Iowa, and Gerard W. Elverum, Minneapolis, Minn., assignors to General Mills, Inc., a corporation of Delaware Application March 27, 1944, Serial No. 528,308

18 Claims. (Cl. 127—67)

The present invention relates to a method and apparatus for separating starch from gluten in wheat and wheat products.

This application is a continuation-in-part of our copending application Serial No. 383,678, filed March 17, 1941.

Wheat starch and wheat gluten have particular properties which make them much more desirable for certain uses than a mixture of the two such as ordinary wheat flour. It has been found desirable, therefore, to separate these constituents from wheat for use in their respective applications.

The present invention involves a novel method and apparatus for separating the starch and gluten from wheat. It constitutes an improvement over prior attempts in this direction in providing a continuous method capable of effecting substantially clean separation of these constituents without any large degree of loss.

It is therefore a primary object of the invention to provide a process of separating starch and gluten from wheat and wheat products.

It is another object of the invention to provide a process of effecting such separation continuously and with large yields.

It is a further object of the present invention to provide a process of separating starch from gluten in wheat and wheat products whereby products of high purity can be obtained.

It is a still further object of the present invention to provide an apparatus for carrying out this process.

These and other objects of the invention will be apparent from the following description of the invention with particular reference to the drawings, in which Figure 1 is a vertical longitudinal sectional view through a cylindrical extractor and through a mechanism for extruding dough into the same;

Figs. 2, 3, 4 and 5 are partial vertical sectional views taken on the lines 2, 3, 4 and 5 respectively, of Fig. 1;

Figs. 6 and 7 are partial enlarged vertical sections similar to Figs. 2 and 3, respectively;

Fig. 8 is an enlarged transverse sectional view on the line 8 of Fig. 1;

Figs. 9 and 10 are partial sectional views illustrating some of the details of Fig. 4;

Fig. 11 is a partial elevation of a paper record strip showing a characteristic power record thereon.

Figure 12:
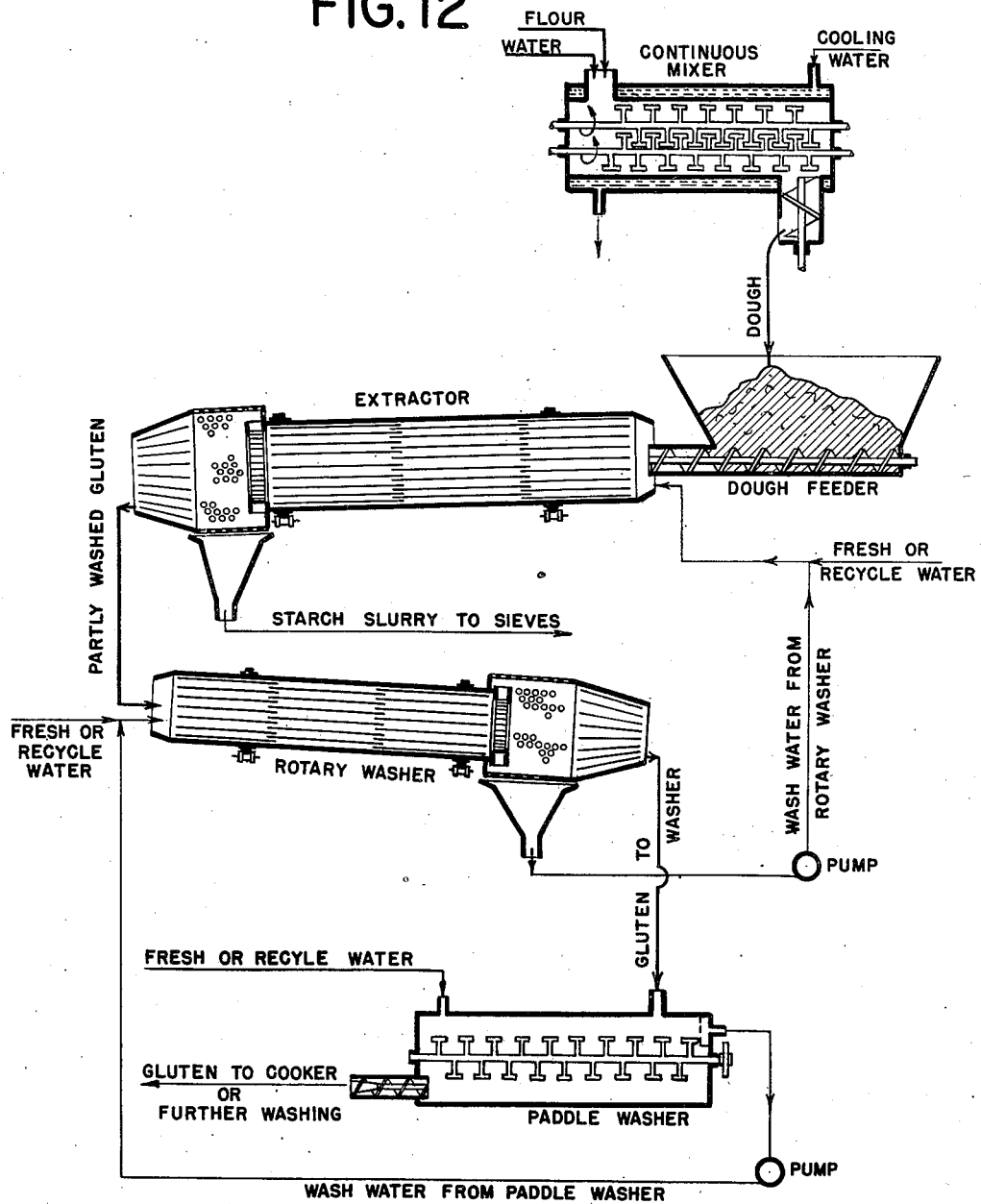
Fig. 12 is a flow sheet diagrammatically illustrating a preferred embodiment of the invention.

Broadly, the invention involves the formation of a relatively thin dough containing starch and gluten particles, hydrating the gluten to render it sticky or tacky so that the respective particles thereof will cohere, working or kneading the dough containing the hydrated gluten so as to agglomerate the gluten and produce large gluten structures in which the gluten is in the form of strings or fibers formed together in a more or less continuous network. In this form the dough tends to cling together and can be washed rather vigorously without danger of breaking the dough up into smaller particles which are difficult to purify. Insufficient kneading will not produce the continuous network, while too much kneading will break down the network. Accordingly, the kneading should be controlled within relatively close limits so as to produce the type of dough which can be washed properly.

The dough in the hydrated and agglomerated form may be worked in the presence of water to wash out the starch which has been unaffected by the dough processing except perhaps that the starch particles have been torn away from the gluten particles. As the washing and working proceeds and part of the starch is washed out, the remaining dough becomes more cohesive and can be worked progressively harder without danger of breaking the dough up into smaller particles.

The dough may be repeatedly washed with various quantities of water and/or recycled liquors until a gluten of the desired purity is obtained. The starch is separated from the gluten in the form of a slurry and may be recovered from the slurry in various manners described in more detail hereinafter.

As raw material for the process, a wide variety of materials may be used. Wheat flour of varying quality, such as patent, straight, clears, and the like, may be employed, depending upon the cost of the respective raw materials and the type of product desired. Ordinarily, the low cost clears are found to be more practicable as they contain substantial quantities of gluten which is capable of forming a strong dough and at the same time they are not sufficiently contaminated with bran particles to render purification unduly difficult.

These "flours" may be of varying degrees of fineness. Ordinarily, the finer the granulation of the flour, the easier it is to separate the starch particles from the gluten particles, although undue grinding of the flour produces an appreciable amount of ruptured starch granules which are difficult to separate. Accordingly, it is preferred to employ a flour having the particle size within the range .002" to .008" particle diameter. Usually it is not desirable to prepare a dough from the dry flour having a granulation in excess of this range. Such larger granulation would require excessive kneading resulting in a deterioration of the gluten. It is possible to employ these larger granulations, however, where the dough is allowed to soak without mixing or where a subsequent wet reduction step is employed. At the same time it will be appreciated that the process may be employed with lesser degrees of success on flour granulations outside this range, particularly the wheat products having larger granulations than this range such as cracked wheat, middlings, granulated flour, etc., as will appear more fully hereinafter.

In addition to the various "flours," other wheat products may be used by modifying the process. For example, it is possible to crack wheat and form rather large particles, soak the particles in water for the requisite amount of time necessary to soften them, and then work the soaked particles into a dough, after which the remaining part of the process described above may be carried out. For example, wheat may be passed through a hammer mill or roll mill, following which any loosened bran particles may be removed. The coarse wheat particles may then be soaked in water until softened, after which they may be formed into a dough. Such a dough contains large quantities of bran, as only a small amount of bran is removed in the rough milling operation. Since this bran, however, is present in the form of large particles, it can be separated much more easily than the finely divided bran particles found in the lower grade of flour. Where coarser raw materials containing appreciable quantities of bran are employed, the dough working step performs an additional important function. It serves to tear starch and gluten particles away from the bran, thereby increasing yields and at the same time simplifying purification of the various products.

It is likewise possible to employ a wet grinding process in preparing a dough from the wheat. For example, wheat may be cracked or ground in the presence of enough water to form a dough. Following cracking or grinding the wheat particles may be allowed to stand until they have softened sufficiently to be worked up into a dough, which may then be processed in the manner disclosed herein for doughs produced in other ways.

These various modifications will be more fully understood after a consideration of the following specific disclosure of the preferred embodiment of the invention employing finely divided wheat products such as the various flours. It will be apparent that the use of the coarser particles will require merely the preliminary soaking step in order to condition them for the dough-making stage.

The apparatus employed is composed in general of a dough mixing device, a dough extruder and a number of rotary drum washing devices. With particular reference to Figs. 1 and 8, the apparatus comprises a mixer and kneader A disposed above and to one side of a hopper B which has its bottom a screw or other means C for feeding dough to the rotary drum extractor D. Water is fed into the extractor along with the dough for the purpose of extracting starch therefrom.

Referring to Fig. 8 the dough mixer and kneader are supported from the floor on a suitable frame 11. On this is mounted two spaced A-frames 12 in which is suitably journaled a shaft 13. This shaft has keyed thereon a gear 14 driven by a pinion 15 from a motor 16 through a suitable reduction.

A dough mixing tank 20 is rotatably mounted on the shaft 13 and is rotatable thereon from the full-line horizontal position shown to the dotted line position by means of a suitable worm and worm wheel operated by an adjusting crank 21.

The shaft 13 carries kneading cranks 25 and 26 which are suitably driven from the shaft 13 so as to stir the mixture of flour and water within the tank 20 while the tank is held in the upright position shown in dotted lines. A cover 30 is secured thereon during the mixing and kneading operation.

Current for driving the electric motor 16 passes through a recording watt-meter 31, this watt-meter having a suitable recording stylus 32.

The hopper B is carried in an upright position on suitable frames 51, 52. The gluten extractor is mounted upon a suitable frame 61 and consists essentially in a cylindrical shell 62 to which is secured spaced concentric rings 63, 64 (Fig. 2) each of which rolls on rollers 65, 66 mounted in suitable roller housings 67.

An enlarged drum 71 secured to the end of this cylinder is perforated, as will later be seen, for the passage of water and starch but preventing the passage of the gluten. An extension 72 of this drum is made slightly conical for a purpose later to be explained. Both the drum 71 and the extension 72 are cantilever extensions of the shell 62, this shell being unsupported except through its rings 63, 64.

The cylindrical shell 62 is driven by means of a sprocket 81 (Fig. 3) and chain 82 from a sprocket on the shaft 83 which is suitably journaled in the frames 51, 52 and 61. This shaft in turn is driven from an electric motor or other suitable source of power 84. The shaft 83 through suitable sprockets and a chain 85 drives the shaft 86 which in turn drives the feed screw 87, previously referred to generally as C, through a suitable reduction gear 88.

The reduced lower end 91 of the hopper B extends into the inlet end 92 of the rotary cylinder which preferably has a conical end 93 to insure that the dough is extruded more or less continuously and so that water and dough fed thereto will not be spilled out. The operation of the feed screw 87 is continuous so that a small stream of dough F is continuously fed to this inlet end of the separator. At the same time, a small stream of water is fed along with the dough through a pipe 97 from any suitable source, the flow of water being controlled by means of a valve 98.

The inside of the cylindrical shell 62 is provided with a series of longitudinally extending flights which vary in size and arrangement at three points within the shell, as shown in Figs. 2, 3 and 4. Thus the shell is provided at the section near the entry end, as shown in Fig. 2, with flights 100 which are relatively low and of uniform height. The flights at all the positions shown in Figs. 2 to 5, inclusive, are preferably spaced uniformly about the shell.

Referring now to the second section, as shown in Fig. 3, one-half the flights, namely 101, are of the same height as the flights 100, while the alternate flights 102 are about twice as high. In the third section, indicated in Fig. 4, all the flights 103 are of about the same height as the flights 102. Likewise, the flights 104 (Fig. 5) are of about the height of the flights 103. An annular dam 71ᵃ (Fig. 9) serves to retain both water and dough in the cylindrical shell to insure a thorough washing.

With particular reference to Figs. 9 and 10, it will be seen that a series of flights 73 extend outwardly from the annular dam 71ᵃ and are enclosed by an additional dam 74 which is higher than dam 71ᵃ. The flights 73 are disposed along chords of the circle of the dam rather than radially, in order that the large masses of gluten may be dropped from one flight to another without danger of breaking into small particles while at the same time the liquid starch slurry may pass between the flights and fall down to and pass through the perforated drum 71. The dam 74 retains the gluten on the flights a sufficient period of time to enable much of the starch slurry to pass between the flights after which sufficient gluten has built up upon the flights to force it over the dam 74.

Beneath the perforated drum 71 is a catch basin 111 having a pipe 112 leading therefrom to any suitable point where the starch bearing water may be caught and the starch recovered therefrom in any manner.

At the outlet end of the extractor is located a water pipe 114 receiving water from any suitable source controlled by means of a valve 115. A suitable receptacle 116 is placed beneath the outlet end of the extractor for the reception of the gluten and a splash board 117 is suitably supported above this receptacle and in front of the outlet end of the extractor to prevent splashing.

In our operation flour is placed in tank 20 and water is added thereto from the tank 37 through valve 38. The cover 30 is then placed on the tank 20 which is in the vertical dotted line position during the dough mixing step.

It has been found highly desirable to employ a thin semi-fluid dough for the separation process. For this purpose we have found that in most instances a dough composed of water and flour and in the proportions of 100 lbs. of flour to 85 lbs. to 125 lbs. of water provides a dough which is well adapted for the extraction of starch. The amount of water used in the dough depends on the amount of gluten in the raw material. A high protein wheat usually requires more water for the preparation of a suitable dough for our purposes than does a low protein wheat. Ordinarily the range of proportions set forth above will include the satisfactory doughs; however, under certain circumstances it may be desirable to operate on either side of this range. In general the dough should be sufficiently fluid to deform of its own weight to conform to the contours of the projections in the extracting and washing drums. At the same time it should be sufficiently firm to stick together and not break apart to any appreciable extent in the extracting and washing steps. We likewise prefer to employ water at a temperature between 20 and 27° C. as this provides a dough which is fluid at all times during the process. Temperatures appreciably higher than 27° C. should be avoided as heat tends to deteriorate the gluten and as the temperature of the dough tends to rise during the kneading step due to the friction.

We have found it necessary to work the dough in the dough stage and before the addition of washing water to an extent sufficient to substantially completely agglomerate the gluten. By this we mean that it is necessary to work the dough sufficiently to cause the individual particles of gluten to cohere to form a more or less continuous network or gluten structure which will cling together and will not be broken up during the subsequent washing step. Gluten becomes adhesive only after it has hydrated or absorbed considerable water. Accordingly, the gluten can be agglomerated only after it has been hydrated. For simplicity we prefer to work the dough continuously while it is becoming hydrated and then subsequently to cause the numerous gluten particles to cohere. As an alternative, however, it is possible to simply prepare a homogeneous dough, allow it to stand to hydrate the gluten, after which the dough may be worked to cause the gluten to agglomerate.

In order to determine the point at which the gluten has become agglomerated, particularly in cases where new operating conditions, such as different feed material and the like, are employed, we prefer to employ the recording wattmeter 31. Its operation is as follows.

When starting the motor 16 with the recording wattmeter 31 in operation, the paper tape record 40 will move upwardly as shown in Fig. 8 and from right to left as shown in Fig. 10 by a feeding mechanism not shown, but which feeds the tape in the direction indicated by the arrows at a uniform rate. At the same time, the load on the motor as indicated by the wattage which it is drawing causes the stylus to move up and down as shown in Fig. 11 and horizontally in Fig. 8. At the start, which is indicated in Fig. 11, the momentary wattage is quite high as indicated by the vertical line 41.

As the water begins to mix with the flour, this line drops rapidly to the point 42 and stays at this point as the gluten in the flour takes up water and becomes hydrated. As part of the gluten becomes hydrated and it begins to agglomerate, the dough becomes stiffer as indicated by the rising portion of the graph 43 which begins to occur about 15 minutes after the mixing is begun. The power consumption continues to increase as more gluten becomes hydrated and subsequently becomes agglomerated until the power consumption levels off and becomes constant, indicating that the kneading has resulted in the substantially complete agglomeration of the gluten. After agglomeration is substantially complete, as indicated by the leveling off of the power consumption curve, mixing is continued for a short time after which the switch operating the motor is cut off and the line 45 drops to zero. Excessive kneading of the dough after completion of the agglomeration should not be employed since excessive working tends to disintegrate the gluten network. Where operating conditions have become standardized, it is possible to employ some other criterion such as mixing time in place of power measurement to determine the point at which agglomeration is substantially complete.

On completing the kneading operation as described, the cover 30 is removed and the tank 20 rocked from the dotted line position to the full line position of Fig. 8 by means of the crank 21, thereby causing the dough E in the dough mixer to run into the hopper B. The screw in the hopper continuously and uniformly feeds the dough to the extractor D in the form of long ropes or strands.

The gluten F is delivered to the inlet end of the extractor together with a small amount of water from the pipe 97. As the shell rotates, the dough F¹, as shown in Fig. 6, rolls over the various flights 100 and as it does so is soft enough to assume the shape of each flight as it rolls over it, thereby constantly deforming the dough which is sufficiently tough to remain in relatively long strands or ropes. This deforming of the dough in the presence of water W, as shown in Fig. 6, loosens the starch granules which at first are mostly surrounded by the fibers of gluten. As this loosening of the starch takes place, the water causes these granules of starch which are insoluble in water to break loose from the gluten mass and to mix with the water. This water, together with the starch which is carried thereby, moves gradually toward the perforated drum 71, the two passing therethrough into the catch basin 111.

As these ropes or masses of dough F³ progress, as shown in Fig. 7, to the mid-section as shown in Figs. 3 and 7, they alternately encounter higher flights 102 as well as flights 101 which are of the same height as the first flights 100. These higher flights increase the amount of working of the dough and cause a more rapid extraction of the starch from the dough. This action is speeded up even more in the third section as shown in Fig. 4 where all of the flights 103 are of the height of the flights 102.

By the time the dough F³ reaches the perforated drum 71, most of the starch has been washed free therefrom. Owing to the slight pitch given to the axis of the cylindrical extractor throughout its length, the dough which is now largely gluten continues to travel from left to right across the drum 71 and this travel of the gluten dough F⁴ continues across the conical section 72. The pitch of the bottom elements of this cone are such as to permit water from the pipe 114 to flow from right to left so as to wash into the catch basin 111 any starch which is further loosened by the water and by the flights 104, but this pitch is not sufficient to prevent the travel at a reduced rate of gluten dough through this conical section owing to the fact that as this dough is carried up the sides of the cone by the flights the dough in rising and falling travels slowly forward.

In Fig. 12 we have illustrated a flow sheet with a more complete flow showing the recovery of gluten, which is entirely continuous including the dough mixing step. In this operation we prefer to employ a continuous dough mixer and kneader of the type shown particularly in Fig. 8 of James Patent No. 2,233,919, granted March 4, 1941. When using a mixer of this type the jacket may be used for cooling water to maintain the temperature of the dough sufficiently low to prevent any deterioration of the gluten. The dough from the dough mixer is then fed into an extractor in much the same manner as previously described. The starch slurry obtained from the extractor is withdrawn and starch may be recovered therefrom in any particular manner. We have found, however, that it is desirable to follow the recovery methods set forth in the copending application of Callaghan and Schilling, Serial No. 497,408, filed August 4, 1943, for Starch process. The gluten recovered from the extractor is passed to a washer which is substantially identical in construction with the extractor. In the washer the gluten is washed with either fresh or recycled water, depending upon the type of product desired. The gluten from the rotary washer may then be passed to a paddle washer which is quite similar in construction to the continuous dough mixer with the exception that the agitator shafts rotate in opposite directions instead of in the same direction as is the case in the dough mixer.

A suitable source of water, either fresh or recycled, or a mixture, as the case may be, introduces water in countercurrent relation in the paddle washer. As the gluten reaches the discharge end of the washer it is taken up by the choked screw conveyor which serves to dewater and discharge the gluten while at the same time preventing the water from escaping from the washer. The wash water is discharged through a suitable screen near the gluten inlet end of the paddle washer and may be used as the wash water in the rotary washer. The thin starch slurry obtained from the rotary washer is preferably employed as the washing water in the gluten extractor as it has been found economical to concentrate the starch in the thin slurry by contacting it with fresh dough in the extractor.

It will be apparent from the above description that the present invention provides a simple and economical process of separating starch and gluten from flour and other wheat products. It is particularly adapted to continuous operation and accordingly obviates many of the cumbersome and inefficient practices heretofore employed in prior attempts to effect such separation.

While various modifications of the invention have been described in detail, it is to be understood that the same is not limited thereto but may be varied within the scope of the appended claims.

We claim as our invention:

1. The process of separating gluten from starch in wheat which comprises forming a semi-fluid dough containing wheat starch and hydrated wheat gluten, kneading the hydrated dough until agglomeration of the gluten is substantially complete but not substantially beyond that point, and working the hydrated and agglomerated dough in the presence of water to wash out the starch.

2. The process of separating gluten from starch in wheat which comprises forming a semi-fluid dough containing wheat starch, hydrated wheat gluten and water in the proportions of about 100 parts by weight of starch and gluten to about 85 to 125 parts by weight of water, kneading the hydrated dough until agglomeration of the gluten is substantially complete but not substantially beyond that point, and working the hydrated and agglomerated dough in the presence of water to wash out the starch.

3. The process of separating gluten from starch comprising forming a dough from a milled wheat product, said dough containing milled wheat product and water in the proportions of about 100 parts by weight of milled wheat product to about 85 to 125 parts by weight of water, hydrating the gluten, kneading the dough until agglomeration is substantially complete but not substantially beyond that point, and working the hydrated and agglomerated dough in the presence of water so as to wash out the starch.

4. The process of separating gluten from starch in flour comprising: mixing flour and water in the proportions of about 100 parts by weight of flour to about 85 to 125 of water to form a dough, thoroughly kneading the same until hydration and agglomeration are substantially complete but not substantially beyond that point, and working the hydrated and agglomerated dough in the presence of water so as to wash out the starch.

5. The process of separating gluten from starch in wheat which comprises forming a semi-fluid dough containing wheat starch and hydrated wheat gluten, kneading the hydrated dough until agglomeration of the gluten is substantially complete but not substantially beyond that point, and working the hydrated and agglomerated dough in the presence of water including deforming the dough over relatively sharp projections by means of its own weight to wash out the starch.

6. The process of separating gluten from starch in flour which comprises forming a dough containing flour and water in the proportions of about 100 parts by weight of flour to about 85 to 125 parts of water, kneading said dough until hydration and agglomeration are substantially complete, working said dough in the presence of water to remove starch therefrom, and progressively increasing the intensity of said working during the course thereof.

7. The process of separating gluten from starch in flour which comprises forming a semi-fluid dough, kneading said dough until hydration and agglomeration are substantially complete, working said dough in the presence of water to remove starch therefrom, and progressively increasing the intensity of said working during the course thereof.

8. The process of separating gluten from starch in wheat which comprises continuously forming a semi-fluid dough containing wheat starch and wheat gluten, continuously kneading the dough until hydration and agglomeration are substantially complete, continuously deforming the dough in the presence of water about relatively sharp projections by means of its own weight, whereby starch is washed from the gluten, continuously separating water and starch from the gluten, and continuously washing the gluten to remove additional starch therefrom.

9. The process of separating gluten from starch in flour comprising mixing flour and water in the proportion of about 100 parts, by weight, of flour to about 85 to 125 parts, by weight, of water to form a relatively thin, semi-fluid dough, hydrating said dough, kneading the dough until agglomeration is substantially complete but not substantially beyond that point and working the hydrated and agglomerated dough in the presence of water so as to wash out the starch.

10. Process of separating starch from gluten in wheat which comprises continuously forming a semi-fluid dough containing wheat starch and wheat gluten, continuously kneading the dough until hydration and agglomeration are substantially complete, continuously extruding the dough in the form of long strands, tumbling the strands in the presence of water about relatively sharp projections by means of its own weight whereby starch is washed from the gluten, continuously separating water and starch from the gluten and continuously washing the gluten to remove additional starch therefrom.

11. An apparatus for separating starch from gluten comprising: an imperforate substantially cylindrical working section, said section having projections extending inwardly from the inside wall thereof and adapted to work a starch-gluten dough to remove starch therefrom, a perforate separating section, and an imperforate slightly conical washing section, said sections being substantially co-axial, each of said sections having an inlet end and an outlet end, the inlet end of the separating section being disposed adjacent the outlet end of the working section, the inlet end of the washing section being disposed adjacent the outlet end of the separating section, said axis being inclined slightly downwardly from the working section to the washing section, the bottom of the washing section, however, being inclined slightly downwardly from outlet end to inlet end, said sections being rotatable about said axis, and means for rotating said sections.

12. An apparatus for separating starch from gluten comprising: an imperforate substantially cylindrical working section, said section having projections extending inwardly from the inside wall thereof and adapted to work a starch-gluten dough to remove starch therefrom, a perforate separating section, and an imperforate washing section, each of said sections having an inlet end and an outlet end, the inlet end of the separating section being disposed adjacent the outlet end of the working section, the inlet end of the washing section being disposed adjacent the outlet end of the separating section, the working section being inclined slightly downwardly from inlet end to outlet end, means for rotating said sections about their axes, means for introducing dough and water into the inlet end of said working section, and means for introducing water into said washing section.

13. An apparatus for separating starch from gluten comprising: an imperforate substantially cylindrical working section, a perforate separating section, and an imperforate washing section, each of said sections having an inlet end and an outlet end, the inlet end of the separating section being disposed adjacent the outlet end of the working section, the inlet end of the washing section being disposed adjacent the outlet end of the separating section, said working section being inclined slightly downwardly from the inlet end to the outlet end, said sections being rotatable, means for rotating said sections, and projections extending inwardly from the inside wall of said working section, said projections being of greater length at the outlet end than at the inlet end of said working section.

14. An apparatus for separating starch from gluten comprising: means for continuously mixing flour and water to produce a dough, means for continuously moving the resultant dough into a working, separating and washing device, said device including an imperforate substantially cylindrical working section, said section having projections extending inwardly from the inside wall thereof and adapted to work a starch-gluten dough to remove starch therefrom, a perforate separating section, and an imperforate washing section, each of said sections having an inlet end and an outlet end, the inlet end of the separating section being disposed adjacent the outlet end of the working section, the inlet end of the washing section being disposed adjacent the outlet end of the separating section, the working section being inclined slightly downwardly from inlet end to outlet end, and means for rotating said sections about their axes.

15. An apparatus for separating starch from gluten comprising: means for continuously mixing flour and water to produce a dough, means for operating said dough mixing means, means for continuously moving the resultant dough into a working, separating and washing device, said device including an imperforate substantially cylindrical working section, said section having projections extending inwardly from the inside wall thereof and adapted to work a starch-gluten dough to remove starch therefrom, a perforate separating section, and an imperforate washing section, each of said sections having an inlet end and an outlet end, the inlet end of the separating section being disposed adjacent the outlet end of the working section, the inlet end of the washing section being disposed adjacent the outlet end of the separating section, the working section being inclined slightly downwardly from inlet end to outlet end, the bottom of the washing section being inclined slightly downwardly from outlet end to inlet end, and means for rotating said sections about their axes.

16. Apparatus for separating starch from gluten which comprises: means for forming a dough, means for extruding the dough continuously in a long strand, a substantially cylindrical dough working means adapted to work the dough in the presence of water to wash starch therefrom, said dough working means having an inlet end and an outlet end, a ring dam disposed adjacent the outlet end, spaced flights arranged non-radially around the ring dam and extending outwardly therefrom, and a further ring dam enclosing the outward end of the flights.

17. A dough working device for separating starch from gluten which comprises a substantially cylindrical rotatable drum having an inlet end and an outlet end and having means for deforming a dough to wash starch therefrom, a ring dam disposed adjacent the outlet end, spaced flights arranged non-radially around the ring dam and extending outwardly therefrom, and a further ring dam enclosing the outward end of the flights.

18. Apparatus for separating starch from gluten comprising an imperforate substantially cylindrical working section, a perforate separating section, each of said sections having an inlet and an outlet end, the inlet end of the separating section being disposed adjacent the outlet end of the working section, said working section being inclined slightly downwardly from inlet end to the outlet end, said sections being rotatable, means for rotating said sections, and projections extending inwardly from the inside wall of said working sections, said projections being of greater length at the inlet end than at the outlet end of said working section.

ROBERT W. CALLAGHAN.
GERARD W. ELVERUM.